United States Patent Office 3,591,656
Patented July 6, 1971

3,591,656
HETEROGENEOUS CATALYST PROCESS
Wolfram R. Kroll, Linden, N.J., assignor to Esso
Research and Engineering Company
No Drawing. Original application Oct. 10, 1967, Ser. No. 674,709. Divided and this application Jan. 24, 1969, Ser. No. 793,877
Int. Cl. C07c 5/02, 5/18
U.S. Cl. 260—683.9          11 Claims

ABSTRACT OF THE DISCLOSURE

Heterogeneous conversion catalysts are prepared by forming, in an inert atmosphere, complexes between a reduced transition metal and a support, the complex is then stabilized by heating. The catalysts so formed may be used for the conversion of organic feed compounds in the presence of hydrogen.

---

This is a divisional application of Ser. No. 674,709 filed Oct. 10, 1967 and entitled "Heterogeneous Catalysts."

FIELD OF INVENTION

This invention relates to the preparation and use of novel heterogeneous conversion catalysts useful in the conversion of organic feeds wherein hydrogen is introduced or admixed with the feed such as in the hydrogenation of organic compounds having nitrile groups, carbonyl groups, aromatic, acetylenic, or olefinic linkages. More particularly, this invention relates to the preparation and use of heterogeneous catalysts which are believed contain stable complexes comprised of a reduced transition metal and a support. In a preferred embodiment of this invention, these stable complexes are formed by impregnating a suitable support material with a nonaqueous soluble transition metal compound followed by the reduction, or activation, of the transition metal with a nonaqueous organometallic reducing agent, and stabilizing the complex by heating the impregnated and activated support, the process being effected in an inert atmosphere under anhydrous conditions.

PRIOR ART

Various heavy metals, particularly transition metals and including noble metals, have been previously described as useful for conducting catalytic reactions. For example, hydrogenation catalysts have included solid metals, slurries of metals, metals dispersed on supports, etc. Supported metal catalysts have been prepared by impregnating a support with a salt solution of the desired metal, followed by reduction of the salt, normally in a hydrogen atmosphere at relatively high temperatures, e.g., 900°–1000° F. However, hydrogen reduction has serious drawbacks in that the required high temperatures often cause sintering of the support material and severe reduction of the surface area of the support, resulting in a rapid loss of activity of the catalyst. Additionally, if water solutions are employed to impregnate the support, a calcining operation is necessitated, prior to reduction, which may also lead to reduced surface area and further loss of catalytic activity.

It has recently been proposed, however, to prepare supported hydrogenation catalysts by reducing a metal soap, e.g., cobalt, molybdenum, or manganese soaps, with an aluminum hydrocarbyl reducing agent, and impregnating a support with the reduced soap. In this manner, a loosely supported metal can be made somewhat more active for hydrogenation reactions; see Canadian Pat. No. 697,780. Nevertheless, significant disadvantages remain with such systems. Thus, for example, relatively high hydrogen pressures, e.g., about 800 p.s.i.g. are required for the hydrogenation (reduction) of organic unsaturation, and the reactions are, of necessity, limited to the liquid phase. Additionally, the catalysts prepared in Canadian 697,780 are finely divided, highly pyrophoric materials which must be prepared and used in oxygen-free, anhydrous atmospheres.

It has now been discovered, however, that highly stable complexes of reduced transition metals and supports may be formed at low or moderate temperatures, these complexes being useful in both liquid and gas phase reactions, particularly as catalysts for hydrogenation reactions. These complex heterogeneous catalysts also permit the hydrogenation of unsaturated organic compounds at relative low hydrogen pressures, e.g., benzene hydrogenations at atmospheric pressure. Since reduction of the transition metal is effected by an organometallic reducing agent, high temperature hydrogen reduction is not necessary, and, since nonaqueous solutions are employed, calcining is also eliminated. Thus, two major disadvantages of prior art catalysts are overcome.

SUMMARY OF THE INVENTION

In accordance with this invention, therefore, highly stable complexes between support materials and reduced transition metals are formed by reacting under an inert atmosphere and under anhydrous conditions, a support material, a nonaqueous soluble transition metal compound, and a nonaqueous soluble organometallic reducing agent, the latter acting to reduce, or activate, the transition metal; and, stabilizing the complex by heating. The complex may be formed in several different ways, to wit: (i) the transition metal compound is reduced in a nonaqueous solution by an organometallic reducing agent followed by impregnation of the support with the solution of the reduced transition metal; (ii) the support is impregnated first with the organometallic reducing agent and then with the nonaqueous solution of the transition metal compound; and (iii) the support is impregnated with a solution of the transition metal compound and then reduced, or activated, by the organometallic reducing agent, the latter method being a particularly preferred method for preparing the novel catalysts of this invention. In any case, however, the complex is then stabilized by heating the impregnated and activated product.

While not wishing to be bound by any particular theory, it is believed that highly tenacious chemical bonds are formed between the reduced transition metal and active sites on the support. Thus, the catalytic material prepared herein differs from simple supported catalysts where only physical bonds between the metal and the support are believed to exist. Because of the nature of this new catalyst high pressures during hydrogenation are not necessary to maintain catalytic stability. The new catalyst which is believed to contain a stable complex between the reduced metal and the support may or may not contain some reducing agent, i.e. in a complex bond. Additionally, while stabilizing temperatures are often high enough to cause sintering of the catalyst, it is believed that the reduced transition metal is spaced far enough apart, e.g. because of spacings caused by chelate structures, that sintering unexpectedly does not occur.

Thus, novel conversion catalysts are prepared which are particularly useful as hydrogenation catalysts, but may also be used to promote such conversions as dehydrogenation, reforming isomerization, hydrocracking, desulfurization, aromatization, dimerization, Fischer-Tropsch synthesis, ammonia synthesis, etc., as well as selective hydrogenation reactions, e.g., removal of acetylenes and/or dienes from monoolefinic or aromatic feed streams.

Generally, the transition metals applicable to this invention are selected from Groups IV–B–VII–B and Group VIII of the Periodic Chart of the Elements. Thus, transition metal compounds wherein the metal may typically be titanium, zirconium, vanadium, chromium, molybdenum, tungsten, manganese, iron, cobalt, nickel, and the platinum group metals, i.e. platinum, palladium, rhodium, ruthenium, iridium, and osmium may be employed. Of the foregoing, the Group VIII metals are generally preferred. Thus, iron, cobalt, and nickel are preferred Group VIII base metals, while platinum, palladium, and rhodium are preferred Group VIII noble metals. Still more preferred, however, are iron cobalt, nickel, and platinum, while most preferred are iron, cobalt and nickel, and yet still more preferred is cobalt, particularly cobalt III.

The anionic component of the transition metal compound is not critical and it is essential only that the resulting compound be soluble in nonaqueous solvents. Therefore, since nonaqueous solvents can be both polar and non-polar, the anionic component of the compound may similarly come from a polar or nonpolar compound. Typical examples of anionic components are $SiF_6^-$, cyanides, azides, halides, e.g., chlorides, bromides, etc. However, organic salts such as result from weak organic acids, e.g. acetates, propionates, butyrates, valerates, etc., stearates, laurates, oleates, and other fatty acid radicals; salts of alcohols, e.g., butanols, hexanols, octanols, glycols, eicosanols, cyclodecanols, etc.; alkoxides, e.g., ethoxides, benzoates, etc. are preferred. Particularly preferred organic components are the oxygen base chelates, because of their solubility and drying characteristics in which the donor atoms are oxygen or oxygen and nitrogen, preferably oxygen, and which are fully described in Martell and Calvin, Chemistry of the Metal Chelate Compounds, Prentice Hall, Inc. (1952), typical examples of which are: acetylacetonates, salicylaldehydes, dimethyl dioxime derivatives, tropolonates, and the like. Most preferred are the acetylacetonates.

The organometallic reducing agent which is used herein to activate the transition metal can generally be described by the formula $MR_n$ wherein M is a metal selected from Group I, II, or III, more preferably Group I–A, II–B, or III–A of atomic number 3 to 30; R is a monovalent organo e.g. halide, alkoxy, etc.; hydrogen; or hydrocarbyl radical; and $n$ is an integer from 1 to 3 and equal to the valence of M. More specifically, R may be same of different, substituted or unsubstituted, saturated or unsaturated, but is preferably hydrocarbyl in nature, e.g., alkyl, aryl, alkaryl, cycloalkyl, aralkyl. Such groups include, for example, methyl, ethyl, n-propyl, isopropyl isobutyl, sec-butyl, tert-butyl, n-amyl, isoamyl, heptyl, n-octyl, n-dodecyl, and the like; 2-butenyl, and the like, cyclopentyl-methyl, cyclohexyl-ethyl, cyclohexylpropyl and the like; 2-phenyl ethyl, 2-phenyl propyl, 2-naphthyl ethyl, methyl naphthyl ethyl, and the like; cyclopentyl, cyclohexyl, 2,2,1-bicycloheptyl, and the like; methyl cyclopentyl, dimethyl cyclopentyl, ethyl cyclopentyl, methyl cyclohexyl, dimethyl cyclohexyl 5-cyclopentadienyl, and the like; phenyl cyclopentyl, and the like; phenyl, tolyl, xylyl, ethyl phenyl, xenyl, naphthyl, cyclohexyl phenyl, and the like. In general, the R group can contain up to about 20 carbon atoms and M may be selected from such metals as lithium, magnesium, calcium, strontium, zinc cadmium, boron, and aluminum.

Preferred reducing, or activating agents are aluminum derivatives of the formula $AlR'_3$ wherein R' is selected from the group consisting of hydrogen and $C_1$–$C_{20}$ hydrocarbyl radicals including oxyhydrocarbyls, e.g. alkoxides, preferably alkyl radicals, wherein at least one R' is a hydrocarbyl radical. More preferably tri-alkyl substituted aluminum is employed as the reducing agent. Of these alkyl radicals of 1–12 carbon atoms are most preferred and those radicals with a decreasing number of carbon atoms are still more preferred. Thus, compounds such as triethyl aluminum, diethyl aluminum hydride, propyl aluminum dihydride, triisobutyl aluminum, tri-n-hexyl aluminum, etc., may be employed. The most preferred compound, which appears to give the best catalyst is, however, trimethyl aluminum. It is particularly important that these reducing agents be substantially and preferably completely, free of water since water can cause hydrolysis of the reducing agent, thereby inhibiting or destroying its reducing potential.

It is essential that the reaction occur under nonaqueous or anhydrous conditions. Thus, the components, i.e. transition metal compound, reducing agent, are generally employed as solutions in nonaqueous solvents. The applicable solvents may then be generally characterized as nonaqueous organic solvents and may be both polar or nonpolar and will not boil off at the temperatures employed. Among the solvents that may be employed are $C_1$–$C_{20}$ amines, $C_1$–$C_{20}$ alcohols, ethers, e.g., diethyl ether, dioxane, tetrahydrofuran, alkyl and aryl ethers, both symmetrical and unsymmetrical, and the like; ketones e.g., acetone, methyl ethyl ketone, methyl isobutyl ketone, and the like; organic halides, e.g., methyl chloride, ethyl chloride, chloroform, and the like; paraffins, cycloparaffins, and isoparaffins, e.g., $C_5$–$C_{20}$ saturated hydrocarbons, such as pentane, hexane, isooctane, cyclohexane, decane, dodecane, cyclododecane, and the like; aromatics, e.g. $C_6$–$C_{20}$ aromatics, such as benzene, xylene, toluene, durene, ethyl benzene, and the like. Of these solvents, however, the paraffins and aromatics are preferred, and the paraffins are most preferred, particularly the n-paraffins. These solvents are used both for the components and as reaction media in catalyst preparation.

The stable complex which gives rise to the increased activity of these catalysts is believed to be formed between the transition metal and a suitable support. Generally, the supports applicable to this invention are those which are or could be used as catalytic support materials. Thus, suitable supports are the oxides of Groups II, III, IV, V and VI–B metals of the Periodic Chart of the Elements, although the oxides of Groups II, III–A, and IV–B metals are preferred, e.g., zinc oxide, magnesia, calcium oxide, strontium oxide, barium oxide, titania, zirconia, vanadia. The Group III–A metal oxides, particularly boria and alumina, are especially preferred. Alumina supports, in fact, are quite outstanding from a cost effectiveness viewpoint, are readily available and are most preferred. Combination supports, e.g., silica alumina, are also effective and of a preferred nature. In addition, such common support materials as clays, both natural and synthetic, e.g. attapulgite clays, diatomaceous earth, e.g., kieselguhr, carbon, e.g., activated carbon, coke, charcoal, graphite and graphite forms such as furnace black, channel black, alkali graphites, etc., molecular sieves, both X and Y type, and the like can be utilized.

The method used to deposit the transition metal onto the support is somewhat critical in that the activity of the catalyst will be dependent to some extent on the manner in which the catalyst is prepared. In all of the following procedures any conventional liquid-solids contacting techniques and apparatus can be employed. In the preferred embodiment for preparing novel catalysts useful as hydrogenation catalysts, the support is first impregnated with a nonaqueous solution of a transition metal salt, e.g., cobaltic acetylacetonate in benzene. Excess solvent is driven off by heating, e.g., to about 150° C. or by vacuum, or both or may remain to be driven off after activation (reduction). A solution of the reducing, or activating agent, e.g., trimethyl aluminum, is then added to the impregnated support. The activation/reduction step, in which the transition metal is reduced to a lower or zero valence state may take a few minutes, e.g., 5 minutes to a few hours, e.g., 10 hours, depending upon the temperatures that are employed, i.e., this reaction occurs with a time-temperature relationship in which increasing temperatures decrease reaction times. The foregoing treating steps i.e., impregnation with transition metal salt solution, activation with reducing agent, solvent removals, are normally conducted at temperatures ranging from about −60° to 150° C., preferably −10° to +100° C. Atmospheric pressure is advantageously employed but pressures are not generally critical. Of course, pressure may be lowered during solvent removal or drying steps to aid in these procedures. After the reduction/activation, excess reducing agent and solvent are removed by heating or in vacuum or both. The heating may be within the temperature ranges previously mentioned. It is necessary to insure removal of all excess reducing agent, since this component can act as a catalyst poison to reduce or destroy catalytic activity. The reducing agent can be removed by any known techniques, e.g., vacuum removal, heating, washing, etc., however, the support is preferably washed one or more times with a nonaqueous solvent for the reducing agent, e.g., those previously mentioned but preferably the same one used to apply the reducing agent. The catalyst is then stabilized i.e., the strong bonds between transition metal and support are formed, by heating in the inert atmosphere wherein all volatile components are driven off. Thus, such inert gases as hydrogen, nitrogen, helium, argon, carbon dioxide, mixtures thereof, and the like may be employed. Generally, the catalyst is heated from about 300° C. to 600° C., e.g. 400° C., but at least above 100° C., e.g. 300° C., for up to about 2 to 3 hours, but at least for about 0.1 hour, preferably about 0.1 to about 4 hours, more preferably about ½ to 1 hour, e.g., 1 hour. If the catalyst is to be used in hydrogenation reactions, it is preferably heated in a hydrogen atmosphere. Additionally, it is normally only necessary to stabilize the catalyst at temperatures slightly above, e.g., 10°–50°, the temperature of its intended use. After stabilization the catalyst is ready for use or may be stored at ambient conditions.

In another, but less preferred embodiment, the reducing agent, in a nonaqueous solution, is first impregnated or anchored on to the support, excess solvent and reducing agent removed as previously described, and the solution of the transition metal compound added, reduction/activation being effected, and excess solution removed. The conditions for treatment and reduction are those as previously described. Stabilization is then effected in the manner described above. In this method, it is essential to remove excess reducing agent prior to treatment with the transition metal salt since it is believed that excess reducing agent poisons the activity of the reduced transition metal-support complex.

In yet another embodiment, the catalyst may be formed by preparing a homogeneous solution of a transition metal compound and a reducing agent wherein the reduction takes place, followed by impregnation of a support with this solution, removal of excess solution, and stabilization. The homogeneous solution may be prepared under the aforementioned conditions and is described in U.S. Pat. #3,323,902. However, when preparing such solutions, the molar ratio of aluminum to transition metal should be in excess of 1/1 in order to achieve complete activation, but is preferably 1/1 to 10/1, more preferably 1/1 to 6/1. Similar ratios should be used in the foregoing preparations since, as mentioned, it is believed that the reducing agent tends to inhibit the activity of the catalyst at ratios above those given here. Thus, in the first reported method for preparing the catalyst, the reducing agent should be added to the transition metal compound impregnated support in the ratios shown, while in the second method enough transition metal compound is added to the reducing agent impregnated support to obtain the desired ratios. (The amount of reducing agent impregnated is easily calculated by measuring the initial solution and the excess that is removed.) During the preparation of the catalyst, in all cases described, the various steps should be carried out under an inert atmosphere, i.e., essentially in the absence of oxygen and moisture, for example, under a nitrogen, helium, $CO_2$, argon, etc. blanket. However, when the stable catalyst is prepared, it appears to be more stable at ambient conditions than conventional supported catalysts such as those in Canadian Pat. 697,780.

Generally, the methods for preparing the catalysts disclosed herein are useful for depositing about 0.01 to 20, preferably 0.1 to 10 wt. percent metal on the support. Moreover, in the case of platinum group metals, this procedure is particularly desirable since low metal concentrations can be deposited onto the support and have shown excellent catalytic activity; consequently the cost of the catalyst can be reduced over conventional supported precious metal catalysts.

In another embodiment of this invention, more than one transition metal may be reduced and, therefore, a supported catalyst of two or more metals may be prepared. Such catalysts are of particular importance for (i) reducing catalyst costs by using a less expensive second metal; (ii) making poison resistant catalysts by co-reducing two transition metal compounds in order to provide a scavenger.

For example, a cobalt/platinum catalyst (Co:Pt=10:1) may be prepared wherein the cobalt acts as a scavenger for poisons, e.g. sulfur containing molecules while the platinum site is not poisoned and can, in contact with hydrogen, help regenerate the poisoned cobalt sites. A particularly valuable catalyst that is prepared in this way is a cobalt-molybdenum supported catalyst useful for hydrogenation of aromatic feedstocks containing sulfur even in large amounts. Other combinations include cobalt-tungsten, cobalt-platinum and nickel-palladium. The advantages of such systems are readily apparent in that costly desulfurization techniques, e.g., such as for the hydrogenation of a steam cracked naphtha, can be eliminated prior to hydrogenation. Additionally, many commercial catalysts are treated with sulfides so as to make them resistant to sulfur poisoning and this step may also be eliminated. Co-reductions or multi-reductions are effected under the same conditions as previously described except that the molar ratios described will now be that of aluminum, or other reducing metal, to total transition metal.

The catalysts described herein may be generally characterized as useful for promoting the conversion of organic compounds in admixture with hydrogen. Such conversions may result in a net consumption of hydrogen, e.g., ammonia synthesis, hydrogenation; a net production of hydrogen, e.g., dehydrogenation reforming; or, a no net change in hydrogen i.e., hydrogen diluent, for example, isomerization. The organic compounds that may be employed will, of course, encompass a variety of feeds that are well known to those skilled in hydrogen reactions. These compounds preferably contain from 2 to about 30 carbon atoms and, in addition to carbon and hydrogen, may also contain such elements as oxygen and nitrogen. Preferably, the compounds are essentially hydrocarbon in nature. Thus, these catalysts are useful in a variety of conversions, but are particularly useful as hydrogenation catalysts. In any reaction, however, the catalysts may be used as slurries or as fixed beds, movable beds, and fluidized beds, in liquid phase and vapor phase reactions, batch, continuous, or staged operations.

Hydrogenation reactions, in particular, can be effected at temperatures and pressures relatively lower than with conventional supported catalysts, e.g., in the area of aromatic hydrogenation or such credits may be taken as increased conversion at similar temperatures. Generally, hydrogenation reactions can be conducted at temperatures from about −60° C. to +400° C., preferably room temperature, e.g., 18–25° C., to 150° C. and under hydrogen pressures below or above atmospheric, generally subatmospheric to 8000 p.s.i., preferably atmospheric to 1000 p.s.i. The catalyst is generally present in catalytic amounts, e.g., about 0.001 mol percent based on feed or larger, e.g., up to about 5%, preferably about 0.01 to 1%.

The hydrogenation reaction is normally conducted in an inert solvent which may correspond to any of the solvents mentioned above for preparing the catalyst, or as may be present in the hydrogenation of gasoline fractions.

Generally, any organic compound capable of being reduced by hydrogen may be hydrogenated by this process. More specifically, the catalyst disclosed herein can be be used to hydrogenate nitrile (carbon-nitrogen), carbonyl (carbon-oxygen), or olefinic, aromatic, or acetylenic (carbon-carbon) unsaturation. The catalysts may also be employed to hydrogenate carbon monoxide to methane and nitrogen to ammonia. Typical examples of compounds of nitrile unsaturation, preferably of $C_2$–$C_{10}$ nitriles, are: imines, oximes, heterocyclic nitrogen compounds, e.g., benzonitrile, benzylimine, quinoline, terephthalonitrile, isophthalonitrile, acetonitrile, propionitrile, and the like; carbonyl unsaturation: aldehydes, ketones, esters, preferably of 1–20 carbon atoms, more preferably 2–10 carbon atoms, e.g., acetone, methyl ethyl ketone, cyclohexanone, benzophenone, acetophenone, steroidal ketones, phorone, isophorone, benzaldehyde, acetaldehyde, propionaldehyde, propyl acetate, benzyl acetate, ethyl stearate, and the like, but more preferably for $C_2$–$C_8$ aldehydes converted to alcohols; carbon-carbon unsaturation: olefins, acyclic and cyclic, mono-, di-, and triolefins, preferably of 2–40 carbon atoms, preferably 2–20 carbon atoms, more preferably 2–12 carbon atoms, e.g. butylenes, pentenes, octenes, nonenes, cyclohexene, cyclopentadiene, cyclododecatriene, cyclododecadiene, vinyl cyclohexene, acetylenes, preferably of 2–8 carbon atoms, e.g., acetylene, methyl acetylene, vinyl-acetylene, hexyne-3, octyne-3, phenyl acetylene, aromatics, preferably of 6–20 carbon atoms, more preferably 6–12 carbon atoms, e.g., benzene, toluene, xylene, naphthalenes, and the like, also unsaturated polymers, e.g., polybutadienes, can be hydrogenated. Preferred feed stocks are those having carbon-carbon unsaturation and about 2 to 40 carbon atoms. One of the advantages of this invention is that carbon-carbon unsaturation may be hydrogenated at relatively low or moderate temperatures and pressures. For example:

TABLE I

| | Olefins | Aromatics | Acetylenes |
|---|---|---|---|
| Temperature, °C.: | | | |
| Broad | −60 to 200 | Rm. temp. to 200 | Rm. temp. to 200. |
| Preferred | Rm. temp. to 100 | Rm. temp. to 150 | Rm. temp. to 150. |
| More preferred | do | Rm. temp. to 100 | Rm. temp. to 100. |
| Pressures, p.s.i.: | | | |
| Broad | Atm. to 1,000 | Atm. to 2,000 | Atm. to 1,000. |
| Preferred | Atm. to 200 | Atm. to 500 | Atm. to 200. |
| More preferred | Atm. to 100 | Atm. to 100 | Atm. to 100. |

Examples of other conversion processes in which hydrogen is admixed with the feed and conversion is promoted by the catalysts disclosed herein are: (i) vapor phase dehydrogenation wherein the hydrogen introduced with the feed can vary from less than to more than a 1/1 molar ratio based on feed, temperatures are generally in excess of about 350° C., preferably 350°–550° C. and hydrogen pressures range from about atmospheric to about 100 p.s.i., for the dehydrogenation of paraffins and/or monoolefins, for example $C_2$–$C_6$ paraffins and monoolefins. A typical example of dehydrogenation in the presence of hydrogen is shown in U.S. Pat. 3,293,319. The conditions and procedures stated therein can readily be employed with catalysts disclosed herein; (ii) isomerization of $C_5$–$C_{20}$ paraffins, e.g., n-hexane, at temperatures of about 100°–400° C., and hydrogen pressures ranging from about atmospheric to 500 p.s.i., generally in an inert solvent; (iii) vapor phase catalytic ammonia synthesis by reaction of nitrogen and hydrogen at temperatures of about room temperature to 550° C. and pressures ranging from about 100–5000 p.s.i., (iv) reforming of, for example, steam cracked naphthas, kerosene fractions, etc. to obtain improved octane ratings at temperatures of about 400°–550° C. and hydrogen pressures ranging from about 100–500 p.s.i. The foregoing processes are all carried out under conventional conditions in conventional apparatus and one skilled in the art, knowing the various reactions that may be effected with these novel catalysts, will readily determine the proper feeds and reaction conditions for optimum conversions.

Having now described this invention, further illustrations are shown in the following examples. However, no limitations are to be implied from these examples over and above those contained in the claims appended hereto, since variations and modifications will be obvious to those skilled in the art.

In Examples 1–26 unless otherwise noted, the catalysts were stabilized by heating to temperatures of about 150° C. in a hydrogen atmosphere for 60 minutes. The results in Table II refer to a "standard benzene hydrogenation test." This test consists of the hydrogenation of benzene to cyclohexane at 95° C., atmospheric $H_2$ pressure, $H_2$ flow rate of 57 ml./min., liquid feed rate of 47 ml./hr. with a feed of a molar solution of benzene in hexane, except in Runs 6–11 where atmospheric pressure was used at 94° C. with a benzene feed rate of 240 ml./hr. in n-heptane, and $H_2$ flow rate of 18 l./hr. In Table II, the "Ratio" column is the molar ratio of reducing agent metal to transition metal. This table shows various runs with the catalysts described herein and comparisons with conventional catalysts in hydrogenation reactions.

EXAMPLE 1

(A) In situ procedure

A porous support, e.g. alumina is impregnated with a solution of cobaltic-acetylacetonate in benzene. Subsequently, the solvent is removed at reduced pressure. In the reduction step trimethylaluminum in benzene is added to the impregnated support. Generally, the reduction is carried out between ambient and 60° C. (but below the boiling point of the solvent) over a period of one or several hours. After the reduction the solvent is removed, e.g. by evacuation. The dry catalyst is washed several times with an aliphatic solvent after which all solvent and excess $(CH_3)_3Al$ is removed. Subsequently, the catalyst is heat treated with a helium-hydrogen mixture to at least 130° C. then treated with pure hydrogen at the same temperature or higher. The catalyst is ready now for use.

(B) Anchoring procedure (see Example 32)

A porous support is treated with an excess of triisobutyl aluminum in a hydrocarbon solvent, e.g. pentane. Subsequently, all excess aluminum alkyl is removed by washing. Then a solution of cobaltic acetylacetonate in benzene is added. Subsequently, all solvent is removed and the catalyst is heat treated as described above. The catalyst is then ready for use.

(C) Soluble procedure (see Examples 29 and 30)

A porous support is treated with a homogeneous solution of a catalyst which was prepared by reduction of a transition metal acetylacetonate, e.g. Fe, in benzene with triisobutylaluminum. Subsequently, all solvent is removed. The catalyst is heat treated as described under (A) and (B). The catalyst is then ready for use.

TABLE II

| Run | Prep. method | Reducing agent | Transition metal | Molar ratio | Support | Percent conv. to $C_6H_{12}$ | Percent Co on cat. | Remarks |
|---|---|---|---|---|---|---|---|---|
| 2 | 1C | Al(i-$C_4H_9$)$_3$ | Co-II(1 mm.) | 2/1 | Carbon | 9.9 | | Comparison of Runs 2 and 3 show that the preparation Method 1A is superior to Method 1C. |
| 3 | 1A | Same | Same as above | 2/1 | do | 20.2 | | |
| 4 | 1A | Al(CH$_3$)$_3$ | Co-II(1 mm.) | 4/1 | Carbon | 92.0 | | Comparison of Runs 4 and 5 show that the catalyst prepared in manner described herein is superior to conventional supported hydrogenation catalyst. |
| 5 | 5% Ni on eta-alumina-conventional catalyst formed by H$_2$ reduction | | | | | 29.6 | | |
| 6 | 1A | Al(CH$_3$)$_3$ | Co-III | 4/1 | Charcoal | 26.7 | 3.1 | Comparsion of Runs 6–11 show new Co catalysts on variety of supports to be superior to conventional cobalt catalyst. Runs 10 and 11 although achieving roughly same conversion show that much less cobalt (41% less) is required to achieve same result with new catalyst. |
| 7 | 1A | Same | Same as above | 4/1 | MS-ID silica | 55.9 | 3.6 | |
| 8 | 1A | do | do | 4/1 | DA-1 alumina | 44.5 | 3.8 | |
| 9 | 1A | do | do | 4/1 | η-Alumina | 40.4 | 4.4 | |
| 10 | 1A | do | do | 4/1 | F-1 alumina | 24.3 | 2.8 | |
| 11 | Conventional Co on eta-alumina, H$_2$ reduced at 454° C. for 2 hours | | | | | 23.6 | 4.75 | |
| 12 | 1A | Al(CH$_3$)$_3$ | Ni (1 mm.) | 6/1 | Charcoal | 26.0 | | Runs 13, 15, 17 had the catalysts heat treated to stabilize and bound the complex to the support. Heat treatment was 300° C. for one hour in hydrogen. Runs 12, 14, 16 had no heat treatment and illustrate catalysts that are simply physically, rather than chemically, bound to support. Increases in conversion are 19%, 15% and 1,000% for Ni, Co, and Rh, respectively. |
| 13 | 1A | Same | Same as above | 6/1 | do | 31.0 | | |
| 14 | 1A | do | Co-II (1 mm.) | 6/1 | do | 78.0 | | |
| 15 | 1A | do | Same as above | 6/1 | do | 90.0 | | |
| 16 | 1A | do | Rh(.1 mm.) | 6/1 | do | 0.6 | | |
| 17 | 1A | do | Same as above | 6/1 | do | 6.0 | | |
| 18 | 1C | Al(i-$C_4H_9$)$_3$ | Co-III | 8/1 | Carbon | 1.9 | | Runs 18 and 19 show that high Al/Co ratios reduce catalyst activity compared to lower ratios. Also comparison of Runs 19 and 20 shows Co to be preferred over Ni as a catalyst metal. |
| 19 | 1C | Same | Same as above | 2/1 | do | 15.2 | | |
| 20 | 1C | do | Ni | 2/1 | do | 3.0 | | |
| 21 | 1C | Al(i-$C_4H_9$)$_3$ | Co-II | 2/1 | Carbon | 62.2 | | Catalyst was washed to remove excess reducing agent but otherwise similar to Run 19. This run shows that washing to remove unreacted excess reducing agent greatly increases activity of the catalyst. |
| 22 | 1A | Al(CH$_3$)$_3$ | Co-II | 2/1 | Carbon | 34.6 | | This run when compared to Run 3, which is identical except for reducing agent, shows Al(CH$_3$)$_3$ to result in more active catalyst. |
| 23 | 1A | Al(i-$C_4H_9$)$_3$ | Co-III | 2/1 | Carbon | 74.0 | | This run is identical to Run 3 except that cobaltic rather than cobaltous acetylacetonate was employed. Greater solubility of Co-III is believed to result in increased conversion. |
| 24 | 1A | Al(i-$C_4H_9$)$_3$ | Co-III | 6/1 | Carbon | 74.0 | | Comparison of Runs 24–26 shows importance of molar ratios of reducing agent to transition metal. Lower ratios generally give better results. |
| 25 | 1A | Same | Same as above | 8/1 | do | 72.0 | | |
| 26 | 1A | do | do | 4/1 | do | 92.0 | | |

EXAMPLE 27

Table III illustrates the hydrogenation of various other carbon-carbon linkages. All runs were carried out at atmospheric pressure. The catalyst was a reduced cobalt on carbon.

TABLE III

| Unsaturated cpd. | Temp., °C. | Liquid feed rate, ml./hr. | Feed solvent | Percent saturation |
|---|---|---|---|---|
| Hexene-1 | 60 | 47 | Pentane | 99+ |
| Cyclohexene | 70 | 47 | do | 99+ |
| Propylene dimer | 64 | 9.5 | None | 100 |
| Cyclooctadiene-1,5 | 119 | 47 | Pentane | 95 |
| Hexadiene-1,5 | 58 | 47 | do | 35 |
| Hexyne-3 | 88 | | do | (1) |

[1] 88.3% selectivity to hexane or at lower temperatures 79% selectivity to hexenes at 9.5% conversion.

These results show that all types of carbon-carbon unsaturation can be hydrogenated, e.g., terminal, internal, cyclic, branched, monoolefins, diolefins, cyclic olefins, acetylenic, etc. Further, liquid feeds and atmospheric pressures are employed where the feed is liquid, which is a distinct advantage over the prior art, particularly in the area of aromatic hydrogenation.

EXAMPLE 28

Preparation and use of platinum catalyst in liquid phase hydrogenation 1.964 g. of PtCl$_4$ was shaken with 249 ml. acetone and filtered. The green colored solution was used for a catalyst preparation. A Filtrol alumina (pellets) which had been treated with K$_2$CO$_3$ (to neutralize the support) and calcined 3 hours at 1000° F. was used. Then 38.6 g. of this material was treated with the above solution in acetone. After 1 hour contact time the solution was decanted and the pellets were dried at ambient temperature and high vacuo.

Subsequently, a solution of 2 ml. triisobutylaluminum in 100 ml. pentane was slowly added to the pellets under nitrogen. After 1 hour contact time, the solution was decanted and the pellets washed twice with 50 ml. pentane. The resulting catalyst pellets were dried in high vacuo. The catalyst contained 0.66% Pt and 0.51% Cl.

6.16 g. of above catalyst pellets were filled into the glass liner of a small autoclave together with 97 mM. cyclohexene. The total reaction volume was brought to about 100 ml. by addition of heptane. Subsequently a hydrogenation was carried out at 22° C. Constant temperature and 100 p.s.i. constant pressure. In spite of insufficient stirring, 84% conversion to cyclohexane was obtained after 200 minutes.

EXAMPLE 29

Dehydrogenation and cracking activity

A soluble cobalt catalyst was prepared by reacting cobalt-II-acetylacetonate in benzene with the p-dioxane complex of triisobutylaluminum (molar ratio aluminum to cobalt as 12:1). To 62 ml. of such a reduced catalyst solution (containing 0.31 mM. cobalt) were added 2 ml. of calcined alumina (1.25 g.). Subsequently, all solvent was removed by evacuation first and later by heating to 250° C. in a microreactor in hydrogen to stabilize the catalyst.

This catalyst was subsequently evaluated for butane dehydrogenation at a space velocity of 2400 v./v./hr. At 405° C. a selectivity of 14% towards butenes at 10% total conversion was obtained. At substantially higher temperatures (e.g., 547° C.) the selectivity to butenes dropped and substantial amounts of methane, ethane, ethylene and propylene were found at over 80% total conversion indicating that the catalyst showed considerable cracking activity.

EXAMPLE 30

Ammonia synthesis

A solution of mM. ferric acetylacetonate in 200 ml. benzene was added to 4 g. of doped alumina under vigorous stirring. Subsequently 100 mM. triisobutylaluminum in 50 ml. benzene were added slowly under stirring. The catalyst settled out and the overstanding liquid was removed. Subsequently, the catalyst was washed twice with 100 ml. pentane and dried. The catalyst was then pilled under nitrogen, broken down, and the catalyst particles of 14–20 mesh size were used for a standard ammonia synthesis run. In this test, 2 ml. of the catalyst were used. The reaction conditions were: 865 p.s.i., 15,000 v./v./hr., 935° F. In the run 2.6% ammonia was formed.

EXAMPLE 31

Pt-catalyst for reforming-liquid phase reaction

Platinic chloride (1.0310 g.) in 150 ml. of a 50/50 mixture of heptane and benzene was reacted with 4 g. Al(i-$C_4H_9$)$_3$ in 50 ml. heptane. After stirring overnight, the solution was diluted to 250 ml. This solution was used for the preparation of a supported platinum catalyst on alumina 30 ml. (17.5 g.) of dry γ-alumina pellets were slurried in 50 ml. pentane. To this slurry, 44 ml. of the above solution was added. After 7 minutes the liquid became clear and colorless. It was allowed to stand for 5 hours when the clear, colorless overstanding solution was decanted and the catalyst pellets were dried in vacuo at 50–70° C. This catalyst contained 0.6% Pt on γ-alumina. It was subsequently tested in an standard power-forming test and compared with a commercial reforming catalyst (see Table IV) of Pt on alumina. This is an example of a liquid phase reaction.

TABLE IV

|  | Zero order reaction rates | |
|---|---|---|
|  | New cat. | Com'l cat. |
| Dehydrocyclisation [1] | 0.054 | 0.057 |
| Isomerization [1] | 0.171 | 0.142 |
| Hydrocracking selectivity [1] | 0.067 | 0.070 |
| DHC+isom. |  |  |
| DHC+isom.+hydrocrack. | 0.77 | 0.74 |
| Percent chloride | 0.33 | 0.56 |

[1] Conversion occurring during reforming.
NOTE.—Reaction conditions: 880° F., 5:1 $H_2$/oil, 300 p.s.i.

The new catalyst shows an excellent performance compared with the commercial standard catalyst, especially in view of the low chloride content.

EXAMPLE 32

The catalyst preparation of 1(B) was carried out by reacting eta alumina with triisobutylaluminum (as described in Example 1(B)) and subsequently adding nickel acetylacetonate. After solvent removal, drying and heat treatment, the catalyst was compared with a conventionally prepared nickel-on-eta alumina catalyst. The complex catalyst of 1(B) gave 58% conversion in the standard benzene hydrogenation test, whereas the conventional nickel catalyst gave only 39% conversion.

EXAMPLE 33

Hydrogenation of carbonyl and olefinic functions

A cobalt-on-silica catalyst prepared as in 1(A), containing 5% cobalt was successfully used to hydrogenate 2-ethylhexenal to 2-ethylhexanol at 135° C. and 1500 p.s.i. A similarly prepared rhodium-on-silica catalyst is also used for the same hydrogenation reaction with similar results.

EXAMPLE 34

Complex nickel-on-silica alumina catalyst for demethanation

A complex, soluble nickel catalyst was prepared in accordance with Example 1(C). It contained 3.6 wt. percent nickel (as complex) on silica-alumina. In a demethanation test using n-heptne at 325° C. at 375 p.s.i. hydrogen pressure and 1.0 v./v./hr. LVSV it gave 4.4% n-hexane whereas a conventional 4.75% nickel on silica-alumina preparation gave only 0.01% hexane under the same test conditions. This shows the high demethanation activity of the complex catalysts which make them useful also for the production of town gas.

EXAMPLE 35

Hexane isomerization over complex platinum on silica catalyst

A 2% complex platinum-on-silica catalyst was prepared as described in 1(A). It was used for hexane isomerization at 339° C. and atmospheric hydrogen pressure with a hydrogen feed rate of 3.8 v./v./hr. 12.1% isomerization, i.e. formation of 2-methylethylpentane, 2,3-dimethyl butane, 3-methyl pentane, methylcyclopentane, was achieved.

The foregoing examples illustrate the wide variety of organic conversions that may be accomplished with this catalyst. However, other reactions, such as desulfurization, olefin disproportionation, Fischer-Tropsch synthesis, e.g., reaction of $H_2$+CO to produce hydrocarbons, aromatization, e.g., feeding naphthas or paraffin mixtures of straight chain paraffins and recovering aromatics at 300–550° C. and atmospheric to 200 p.s.i. hydrogen pressure, propylene dimerization or codimerization of propylene with butene to make such products as n-hexenes, n-heptenes, 2- and 4-methyl pentene-1, etc., can be conducted under conventional conditions.

EXAMPLE 36

Supported Fe catalyst

A supported complex iron-on-carbon catalyst was prepared according to method 1(A). The resulting catalyst contained 1 mM. iron on 2 g. charcoal. It was tested in the standard benzene hydrogenation test (100° C. atmospheric pressure) and gave 34% conversion to cyclohexane. It should be noted in this regard that active conventional low iron content supported catalysts are commerically nonexistent since the hydrogen reduction requires very high temperatures which lead to sintering. There are no commercial supported iron catalysts available for benzene hydrogenation.

What is claimed is:

1. A process for the conversion of organic feed compounds in the presence of hydrogen which comprises contacting the feed, in admixture with hydrogen and under conversion conditions, with a catalyst, the preparation of which comprises (1) impregnating a support with a solution of a soluble transition metal being selected from the group consisting of Groups IV–VII–B and VIII metals, and said support selected from the group consisting of oxides of Groups II–V and VI–B metals, and carbon and silica; and (2) reducing the impregnated support with an organo-metallic reducing agent of the formula $MR_N$, wherein M is a Group I through Group III metal, R is selected from the group consisting of hydrogen and $C_1$–$C_{20}$ hydrocarbyl radicals and N is an integer of 1–3 equal to the valence of M, at a temperature of about ambient to 60° C.; (3) removing excess solvent and reducing agent; and (4) heating the product at a temperature of from about 100° C. to 600° C. for at least about 0.1 hour, the catalyst formation process being conducted under an inert atmosphere and anhydrous conditions.

2. The process of claim 1 wherein the conversion reaction is hydrogenation.

3. The process of claim 1 wherein carbon-carbon unsaturation is hydrogenated.

4. The process of claim 3 wherein a $C_2$ through $C_{40}$ olefin is hydrogenated.

5. The process of claim 2 wherein a $C_2$ to $C_{12}$ olefin is hydrogenated.

6. The process of claim 1 wherein carbon-oxygen unsaturation is hydrogenated.

7. The process of claim 6 wherein the carbon-oxygen unsaturation is aldehydic.

8. The process of claim 1 wherein the conversion is dehydrogenation.

9. The process of claim 1 wherein the conversion is reforming.

10. The process of claim 1 wherein the conversion is ammonia synthesis.

11. The process of claim 1 wherein the conversion is isomerization.

References Cited

UNITED STATES PATENTS

| | | | |
|---|---|---|---|
| 3,031,514 | 4/1962 | Kosmin | 252—429 |
| 3,113,986 | 12/1963 | Breslow et al. | 260—683.9 |
| 3,288,720 | 11/1966 | Moretti et al. | 252—429 |

FOREIGN PATENTS

| | | | |
|---|---|---|---|
| 697,780 | 11/1964 | Canada | 252—429 |

HERBERT LEVINE, Primary Examiner

U.S. Cl. X.R.

23—199; 208—138; 252—428, 429, 430, 431; 260—617, 638, 676, 683.3, 683.65